(12) United States Patent
Barakat et al.

(10) Patent No.: US 6,700,898 B1
(45) Date of Patent: Mar. 2, 2004

(54) MULTIPLEXED OUTPUT OF STATUS SIGNALS IN ETHERNET TRANSCEIVER

(75) Inventors: Edmond H. Barakat, Allentown, PA (US); Joseph A. Manzella, Macungle, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/496,609

(22) Filed: Feb. 3, 2000

(51) Int. Cl.[7] .................................................. H04J 3/14
(52) U.S. Cl. ...................... 370/442; 370/458; 370/463
(58) Field of Search ............................... 370/431, 442, 370/458, 463

(56) References Cited

U.S. PATENT DOCUMENTS

| | | | | |
|---|---|---|---|---|
| 4,037,199 A | * | 7/1977 | Rozehnal et al. | ...... 340/870.13 |
| 4,630,193 A | * | 12/1986 | Kris | ............. 713/502 |
| 5,276,443 A | * | 1/1994 | Gates et al. | ............. 710/2 |
| 5,555,436 A | * | 9/1996 | Gavish | ............. 710/1 |
| 5,598,418 A | * | 1/1997 | Lo et al. | ............. 370/501 |
| 5,819,112 A | * | 10/1998 | Kusters | ............. 710/36 |
| 5,874,930 A | * | 2/1999 | McRobert et al. | ............. 345/44 |
| 6,058,427 A | * | 5/2000 | Viswanath et al. | ......... 709/231 |
| 6,483,849 B1 | * | 11/2002 | Bray et al. | ............. 370/465 |

* cited by examiner

Primary Examiner—Huy D. Vu
Assistant Examiner—Daniel Ryman
(74) Attorney, Agent, or Firm—William H. Bollman

(57) ABSTRACT

A multi-port Ethernet device having a MUX mode passing internal status signals (e.g., ACT, LINK, SPEED, FDUP, CS, TPJS, TPAPS, RS, and/or XS) for each of a plurality of Ethernet ports in parallel over a common set of external pins. The Ethernet device may be 'fixed' in a multiplexed mode such that the MUX mode is the only way in which internal status signals for each Ethernet port is transmitted external to the Ethernet device, or the Ethernet device may provide a MUX mode for status signal output in addition to otherwise conventional output modes (e.g., a parallel status signal output mode and/or a serial status signal output mode). In MUX mode, all desired internal status signals (e.g., all nine (9) standard Ethernet status signals) are time division multiplexed onto the common set of external pins one Ethernet port at a time.

17 Claims, 7 Drawing Sheets

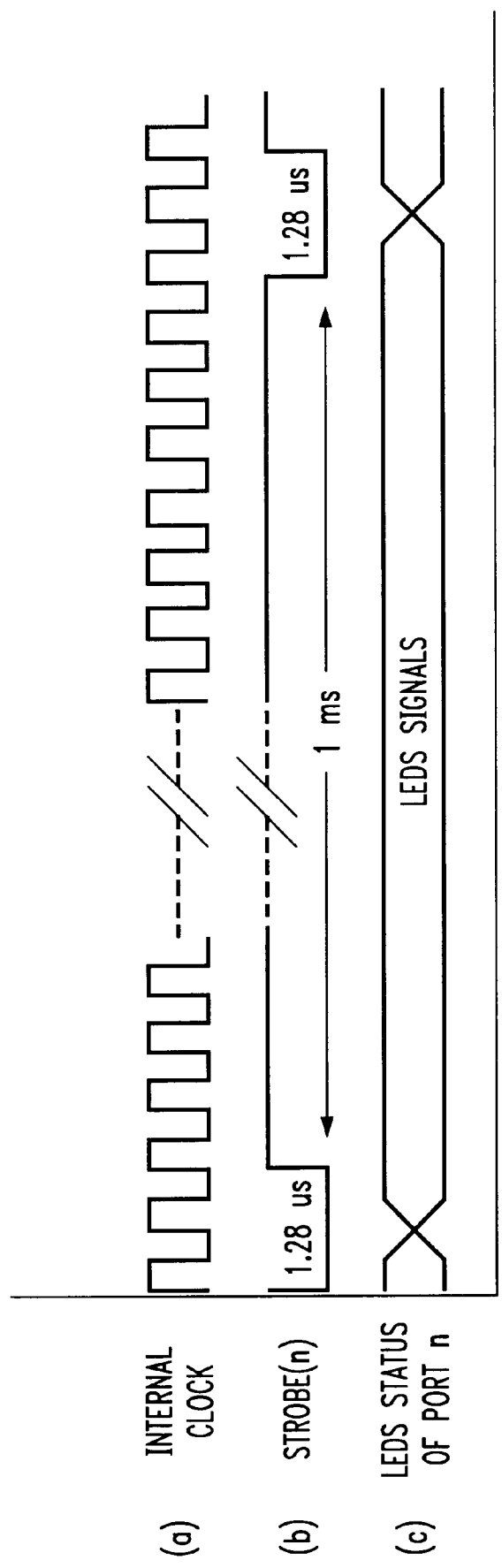

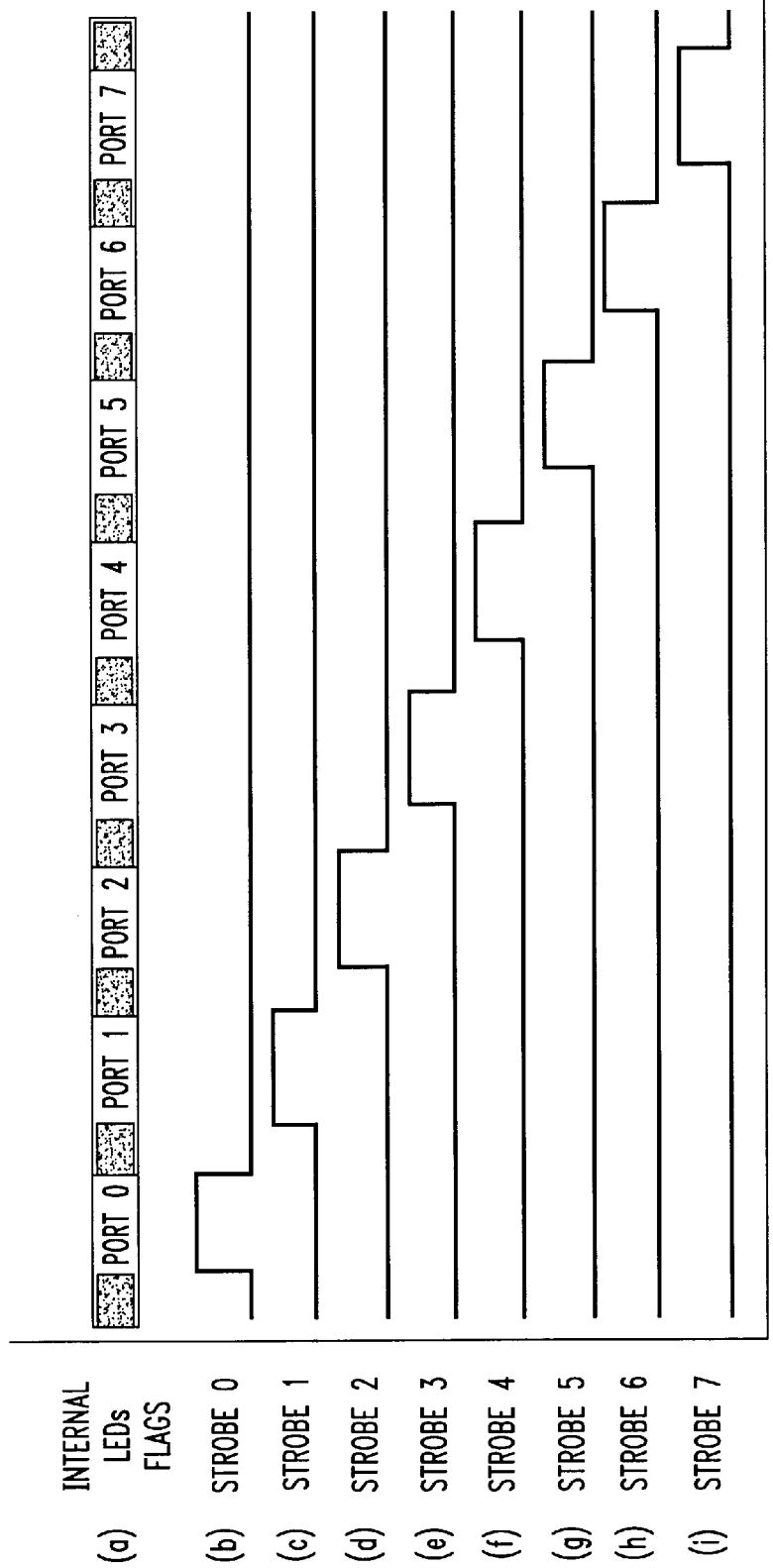

FIG. 7
PRIOR ART

PHY STATUS

| 701 | 702 | 703 | 704 | 705 | 706 | 707 | 708 | 709 |
|---|---|---|---|---|---|---|---|---|
| ACT | LINK | SPEED | FDUP | CS | TPJS | TRAPS | RS | XS |

700

MULTIPLEXED OUTPUT OF STATUS SIGNALS IN ETHERNET TRANSCEIVER

BACKGROUND OF THE INVENTION

1. Field of the Invention

This invention relates generally to Ethernet devices. More particularly, it relates to an efficient and cost effective manner of allowing external access to internal Ethernet flags.

2. Background of Related Art

Ethernet is a widely-installed local area network (LAN) technology. Using an Ethernet interface, many computer devices can communicate with one another over a LAN. Ethernet is specified in a well known standard, IEEE 802.3.

An Ethernet LAN typically uses twisted pair wires or coaxial cable. The most commonly installed Ethernet systems are called 10Base-T and provide transmission speeds up to 10 megabits per second (Mbps).

Fast Ethernet, or 100Base-T, provides transmission speeds up to 100 Mbps. Fast Ethernet is typically used for LAN backbone systems, supporting workstations with 10Base-T interfaces. Gigabit Ethernet provides an even higher level of backbone support at 1000 Mbps.

Ethernet devices are connected to the Ethernet LAN and compete for access using a Carrier Sense Multiple Access with Collision Detection (CSMA/CD) type protocol.

Computer devices connected to the Ethernet LAN include an Ethernet interface (port). Initially, computer devices included a single Ethernet LAN interface (port). However, as computer networking became increasingly important in today's world, and as Ethernet has gained in popularity, computer needs now typically require more than one Ethernet port.

FIG. 6 shows a conventional Ethernet device (e.g., Ethernet integrated circuit) 600 including a plurality of Ethernet ports 602, 604, 606. Each of the Ethernet ports 602, 604, 606 includes a data/address and LAN connection bus 610, 612, 614 and a status line bus of the physical layer transceiver for the Ethernet protocol (PHY) 616, 618, 620, respectively. Typically, each status line bus 616, 618, 620 includes up to nine (9) separate status signals.

FIG. 7 shows in more detail conventional signals contained separately on a conventional Ethernet port status bus.

In particular, as shown in FIG. 7, the PHY status bus 700 includes an ACT signal 701, a LINK signal 702, a SPEED signal 703, an FDUP signal 704, a CS signal 705, a TPJS signal 706, a TPAPS signal 707, an RS signal 708, and an XS signal 709.

The ACT signal 701 indicates activity on the respective Ethernet port. The LINK signal 702 indicates whether the relevant Ethernet port is up or down. The SPEED signal 703 indicates the speed of the Ethernet link, e.g., 10 Mb or 100 Mb. The FDUP signal 704 indicates whether the Ethernet link is full duplex or half duplex. The CS signal 705 is a carrier sense signal for the relevant Ethernet link. The TPJS signal 706 is a twisted pair jabber sense meaning that the receiver is detecting a jabber condition. The TPAPS signal 707 is a twisted pair auto polarity sense signal. The RS signal 708 is a receiving sense indicating whether or not the relevant Ethernet port is receiving. The XS signal 709 indicates whether or not the Ethernet port is transmitting.

In a typical Ethernet Transceiver device 600, normally called PHY, each of the status signals (also called internal flags) 701–709 are output from the Ethernet device 600 to allow observation of the health of the Ethernet transceiver device 600. For instance, each of the status signals 701–709 may be used to drive individual LEDs for visual inspection of the health of the Ethernet transceiver device 600. Alternatively, or additionally, each of the separate status signals 701–709 may be input into an external register for read back by a processor or other device.

However, due to typical design limitations in the desired maximum number of external pins of a particular Ethernet transceiver device (particularly Ethernet transceiver devices having more than one Ethernet port), there is typically pressure on a designer to eliminate use of a number of the status signals, degrading the full observation capability of the Ethernet transceiver device 600.

Alternatively, instead of eliminating some status signals, two different techniques are conventionally used to bring the internal status signals 701–709 external to a multi-port Ethernet transceiver device: A parallel technique and a serial technique. Oftentimes, the techniques may both be implemented in a particular multi-port Ethernet transceiver device, allowing operation in either a corresponding parallel mode or a corresponding serial mode.

In parallel mode, a subset of the status signals 701–709 are passed through directly onto a corresponding number of external pins. If all of the status signals 701–709 are to be made available for each Ethernet port, nine separate external pins for each Ethernet port will be required. Of course, fewer than all of the status signals 701–709 may be made available, but this would provide only a subset of all status signals, and thus a complete observation of the operation of each of the Ethernet ports is not possible.

In serial mode, the status signals 701–709 are serialized and passed external to the Ethernet transceiver device 600 using a data pin, a clock pin, and any control pins if desired. Serial transmission of the status signals 701–709 minimizes the external pin count in multi-port Ethernet transceiver devices 600, but increases the cost and complexity of the external board because the serialized status signals 701–709 must be converted from serial back into separate, parallel signals. Thus, using serial transmission techniques to pass the status signals 701–709 external to the Ethernet transceiver device, complex external logic is required to capture and analyze the serial stream data containing the internal status signals.

There is a need for a technique and device which both minimizes external pin count requirements while at the same time provides all available status signals for each Ethernet port external to the Ethernet transceiver device.

SUMMARY OF THE INVENTION

In accordance with the principles of the present invention, a multi-port Ethernet device comprises a plurality of Ethernet ports, and an internal multiplexer. The plurality of Ethernet ports correspond to a respective plurality of status signal busses. The plurality of status signal busses are input to the internal multiplexer. A common status bus output from the multiplexer is available at external pins of the Ethernet device. A port valid signal indicates which of the plurality of status signal busses is being output by the internal multiplexer.

A method of minimizing external pins in a multi-port Ethernet device in accordance with another aspect of the present invention comprises multiplexing status signals from each of a plurality of Ethernet ports in the Ethernet device into a common status signal bus. The multiplexed status signals are output over a common set of external pins of the Ethernet device.

A method of minimizing external pins in a multi-port Ethernet device in accordance with yet another aspect of the present invention comprises sequentially outputting a parallel representation of a status of each of a plurality of Ethernet ports over a common set of external pins of the Ethernet device.

BRIEF DESCRIPTION OF THE DRAWINGS

Features and advantages of the present invention will become apparent to those skilled in the art from the following description with reference to the drawings, in which:

FIGS. 3A and 3B are exemplary timing diagrams graphically illustrating how the MUXed mode of operation works. FIG. 3A shows the general timing with respect to each Ethernet port, and FIG. 3B shows the time division multiplexed nature of all Ethernet ports as they are sequentially multiplexed and made externally available on a common status signal bus.

FIG. 7 shows in more detail conventional signals contained separately on a conventional Ethernet port status bus.

DETAILED DESCRIPTION OF ILLUSTRATIVE EMBODIMENTS

In accordance with the principles of the present invention, all internal status signals in a multi-port Ethernet device (e.g., integrated circuit) are made available external to the Ethernet integrated circuit in a multiplexed ("MUX") mode. The Ethernet device may be 'fixed' in a multiplexed mode such that the MUX mode is the only way in which internal status signals for each Ethernet port is transmitted external to the Ethernet device, or the Ethernet device may provide a MUX mode for status signal output in addition to otherwise conventional output modes (e.g., a parallel status signal output mode and/or a serial status signal output mode).

In MUX mode, all desired internal status signals (e.g., all nine (9) standard Ethernet status signals) are time division multiplexed onto a common bus external to the Ethernet integrated circuit one port at a time. Also output are strobe signals indicating which port's status signals are valid on the common status signal bus.

Having all internal status signals available external to a multi-port Ethernet transceiver device such as an Ethernet integrated circuit over a common status signal bus provides complete insight into the functionality of each Ethernet port with a minimum number of external pins.

Figure 1:
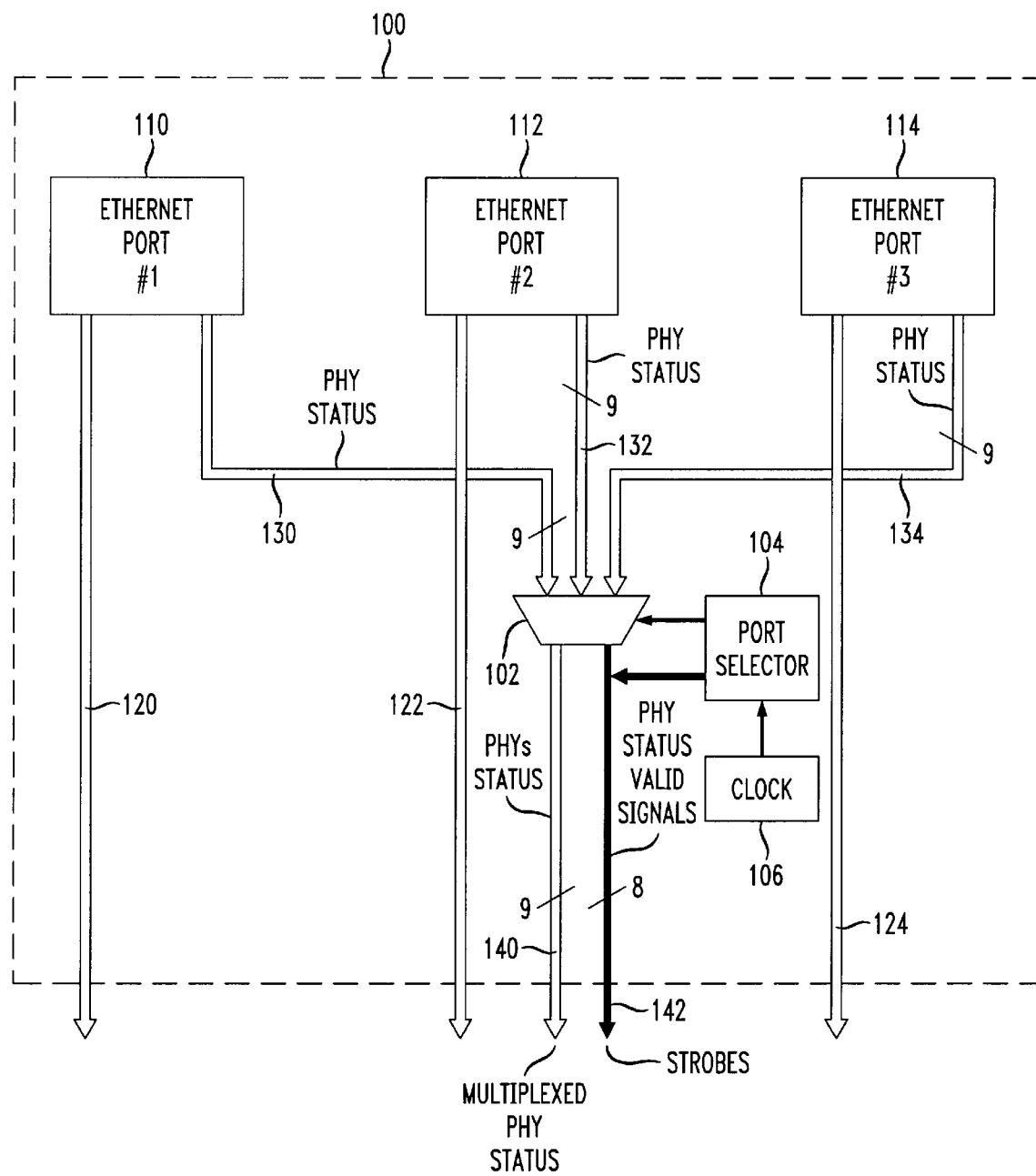
FIG. 1 shows a multi-port Ethernet transceiver device including three Ethernet ports and a MUX mode passing status signals for all Ethernet ports to common external pins in a time division multiplexed fashion together with port valid signals, in accordance with the principles of the present invention.

FIG. 1 shows a multi-port Ethernet transceiver device 100 including three Ethernet ports 110, 112, 114 and a MUX mode passing status signals for all Ethernet ports to common external pins in a time division multiplexed fashion together with port valid signals, in accordance with the principles of the present invention.

In particular, in FIG. 1, the first Ethernet port 110 includes a LAN connection bus 120 in addition to an internal Ethernet status signal bus 130 including the conventionally available status signals 701–709. Similarly, the second Ethernet port 112 includes a LAN connection bus 122 in addition to another internal Ethernet status signal bus 132, and the third Ethernet port 114 includes a LAN connection bus 124 and yet another internal Ethernet status signal bus 134. Each of the Ethernet ports 110, 112, 114 have additional signals (e.g., data/address/control) allowing a suitable processor to communicate with all Ethernet ports 110, 112,114.

In accordance with the principles of the present invention, the multi-port Ethernet transceiver device 100 includes a status signal multiplexer 102 controlled by a port selector.

The multiplexer 102 has input thereto each of the separate status signal busses 130, 132, 134, and outputs a selected one of the status signal busses on a common status signal bus 140. The common status signal bus 140 is made available external to the Ethernet transceiver device 100.

The port selector 104 utilizes a system clock signal from an appropriate clock source 106 to generate periodic port valid signals 142, one for each Ethernet port 110, 112, 114. The port valid signals 142 are made available external to the Ethernet transceiver device 100.

Using the shown three port Ethernet transceiver device as an example, implementation of a MUX mode requires nine external pins for the common status signal bus 140, plus three port valid signals 142, or a total of twelve (12) external pins to transmit all status signals for all Ethernet ports external to the Ethernet transceiver device 100.

Figure 2:
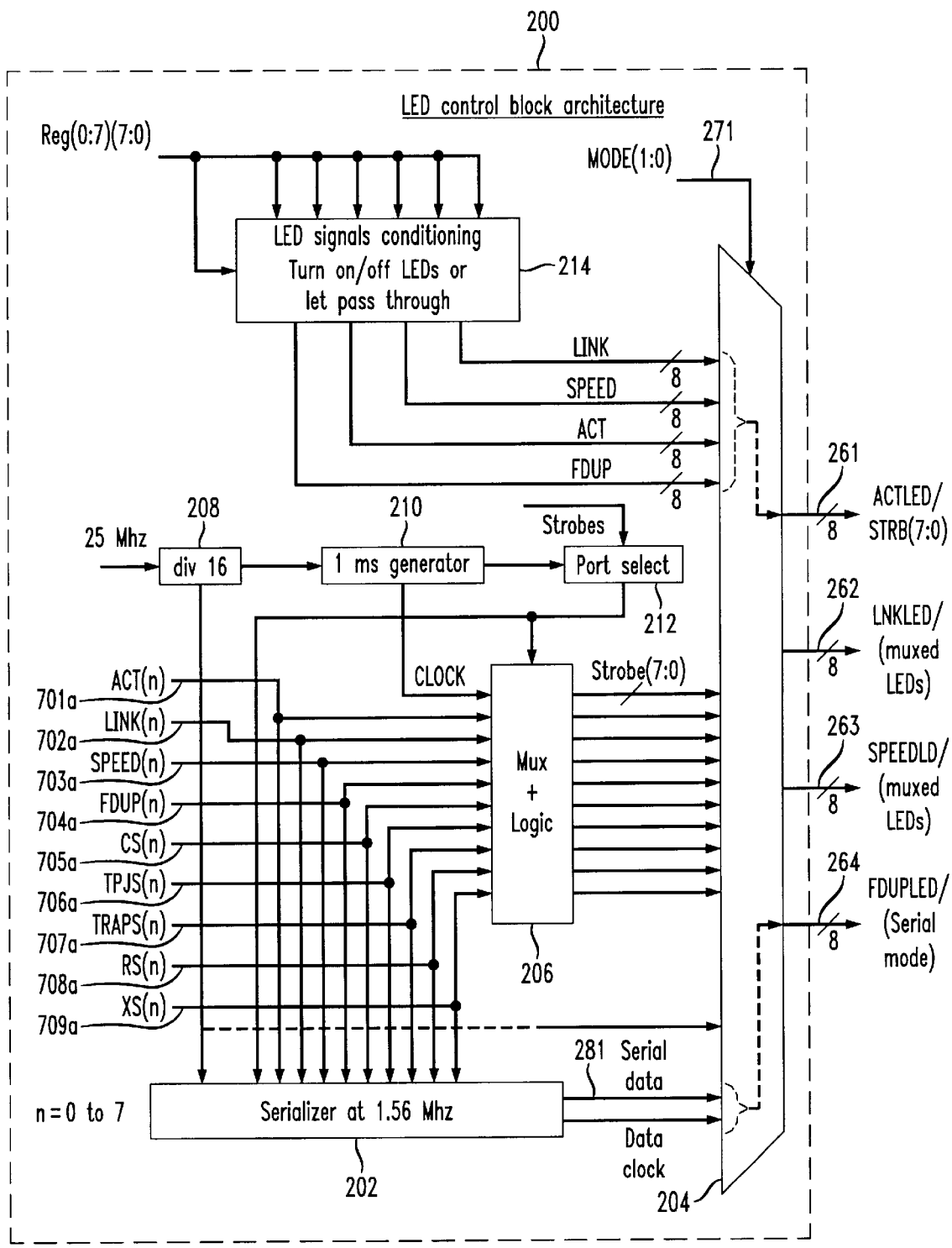
FIG. 2 is a detailed exemplary drawing of the relevant portion of an eight (8) port Ethernet transceiver device including output of internal status signals for all eight ports using a MUX mode, in accordance with the principles of the present invention.

FIG. 2 is a detailed exemplary drawing of the relevant portion of an eight (8) port Ethernet transceiver device 200 including output of internal status signals for all eight ports using a MUX mode, in accordance with the principles of the present invention.

In addition to the MUX mode in accordance with the principles of the present invention, FIG. 2 shows the inclusion of a parallel mode and a serial mode to output all status signals of each of the plurality of Ethernet ports. However, the principles of the present invention relate equally to the implementation of an Ethernet device having only a MUX mode of output of the status signals for each Ethernet port.

The eight port Ethernet transceiver device 200 shown in FIG. 2 provides a user with operation in a MUX mode, as well as with the otherwise conventional parallel mode and serial mode.

In particular, in FIG. 2, an eight port Ethernet transceiver device 200 includes thirty-two (32) external pins, gathered into four separate eight bit busses 261–264. While 32 external pins are shown, the principles of the present invention relate to the use of fewer or more external pins than 32.

Moreover, while the external pins are shown gathered into 8-bit busses 261–264, the principles of the present invention relate equally to larger- or smaller-bit busses.

The MUX mode is programmably selected by MODE signal 271 (as are the parallel mode and serial mode). The MODE signal 271 may be hardwired, or may originate from an appropriate bit register or other memory location.

In MUX mode, the status signals 701a–709a are passed through a MUX and logic module 206, and through an output MUX 204, onto the necessary number of external pins 261–264, together with a port valid signal for each Ethernet port.

For instance, in the given embodiment, eight (8) port valid strobe signals (one for each Ethernet port in the Ethernet transceiver device 200) are output on the first external pin bus 261. Also, eight of the nine time division multiplexed status signals 701a–708a for each of the Ethernet ports are output on the second set of external pins 262, while the ninth status signal 709a is output on the first pin of the third set of external pins 263. The remaining seven external pins in the third set of external pins 263, and all eight of the fourth set of external pins 264 are unused in the disclosed implementation of a MUX mode.

In the disclosed embodiment, the particular mode of operation is chosen at power up, e.g., by bootstrapping designated input pins MODE[1:0]. However, the principles of the present invention relate equally to selection of a mode of operation either through software and/or hardware control, and either at power up or at any point during operation of the relevant Ethernet transceiver device 200.

In comparison, parallel mode uses all thirty-two (32) external pins 261–264 to output only four of the available nine internal status signals for each Ethernet port (4 signals×8 ports=32 pins). Thus, while parallel mode can be used, all internal status signals are not brought out to external pins in parallel mode.

In serial mode, all status signals 701a–709a for each of the eight (8) Ethernet ports are input to an appropriate serializer operating at an appropriate clock rate (e.g., 1.56 MHz), for output as a serial data stream 281, together with an appropriate serial data clock signal 282. While the serial mode requires only 2 external pins in, e.g., the fourth set of external pins 264, a serial-to-parallel converter is required external to the multi-port Ethernet transceiver device 200 to recover the separate status signals for each of the eight ports.

From a standpoint of external pin count, serial mode is optimal. However, the serial mode requires complex logic external to the Ethernet integrated circuit to capture and decipher the bit stream for each port.

The Muxed Mode, as shown in FIG. 2, requires a total of only seventeen external pins to make all nine internal status signals for each of the eight (8) Ethernet ports available external to the multi-port Ethernet device 200. As a result, the external logic necessary to capture the muxed signals is direct, simple and inexpensive.

Using the MUXed mode in accordance with the principles of the present invention, only nine external pins are required to pass the nine status signals external to the Ethernet transceiver device 200 (e.g., to drive LEDs) plus an additional eight external pins (one for each Ethernet port) are required to declare when the status signals for each of the eight Ethernet ports are active on the common external status signal bus. Thus, only seventeen total external pins are required for an eight-port PHY, as compared to seventy-two (72) which would otherwise be required using the conventional parallel mode of operation for the same status signals.

FIGS. 3A and 3B are exemplary timing diagrams graphically illustrating how the MUXed mode of operation works. In particular, as shown in FIGS. 3A and 3B, FIG. 3A shows the general timing with respect to each Ethernet port, and FIG. 3B shows the time division multiplexed nature of all Ethernet ports as they are sequentially multiplexed and made externally available on a common status signal bus.

Waveform (a) of FIG. 3A shows an internal clock signal, waveform shows a port valid strobe signal (active high) in relation to the internal clock signal shown in waveform (a). In the disclosed embodiment, the port valid signal is active for approximately one (1) millisecond. Of course, the principles of the present invention relate to other timing relationships of the port valid signals. In response to the port valid signal, the relevant status signal data can be captured from the external pins, as depicted in waveform (c) of FIG. 3A.

As shown in the example of FIG. 3A, the strobe width may be, e.g., 1 millisecond (mS). A dead cycle between strobes may be, e.g., 1.28 microseconds ($\mu$S) as shown. The port valid signal strobe rate may be, e.g., 8 mS for each of a plurality of Ethernet ports. The MUXed status signals are valid about 640 nanoseconds (nS) before the rising edge of the port valid strobe signal, and about 640 nS after the falling edge of the port valid strobe.

Waveform (a) of FIG. 3B depicts the time division multiplexed sequential nature of the status signals for each of the Ethernet ports, one after another, on the common external bus. Waveforms (b) to (i) of FIG. 3B show an exemplary relative relationship of port valid signals for each of the eight Ethernet ports represented in FIG. 2, respectively. As shown in FIG. 3B, a period of time between the active portion of adjacent port valid signals is preferred to allow the common status signal bus time to settle.

Figure 4:
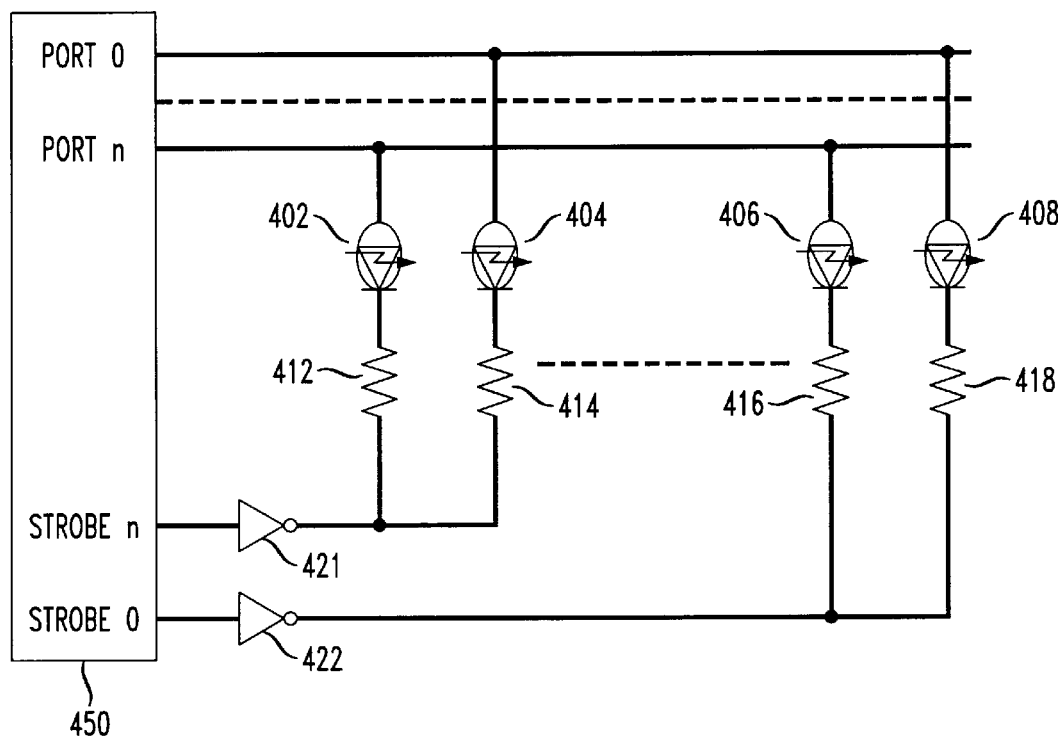
FIG. 4 shows an example use of the port valid strobe signals to latch the status signals into appropriate latches or registers for each Ethernet port, in accordance with the principles of the present invention. The port valid strobe signals may be used in any appropriate manner.

The port valid strobe signals may be used in any appropriate manner. FIG. 4 shows an example use of the port valid strobe signals to latch the status signals into appropriate latches or registers for each Ethernet port, in accordance with the principles of the present invention.

In particular, as shown in FIG. 4, the separate port valid strobe signals may latch the status signals into separate latches or registers relating to respective Ethernet ports. Alternatively, or additionally, the port valid strobe signals may be used to drive a high-powered inverter which connects to one side of that Ethernet ports status signals (e.g., LED signals). In such a case, LEDs corresponding to the level of the status signals for any Ethernet port would be lit $\frac{1}{8}^{th}$ of the time. As shown in FIG. 4, if the inverters are required to sink current for the LEDs, the resistors should be sized accordingly.

Figure 5:
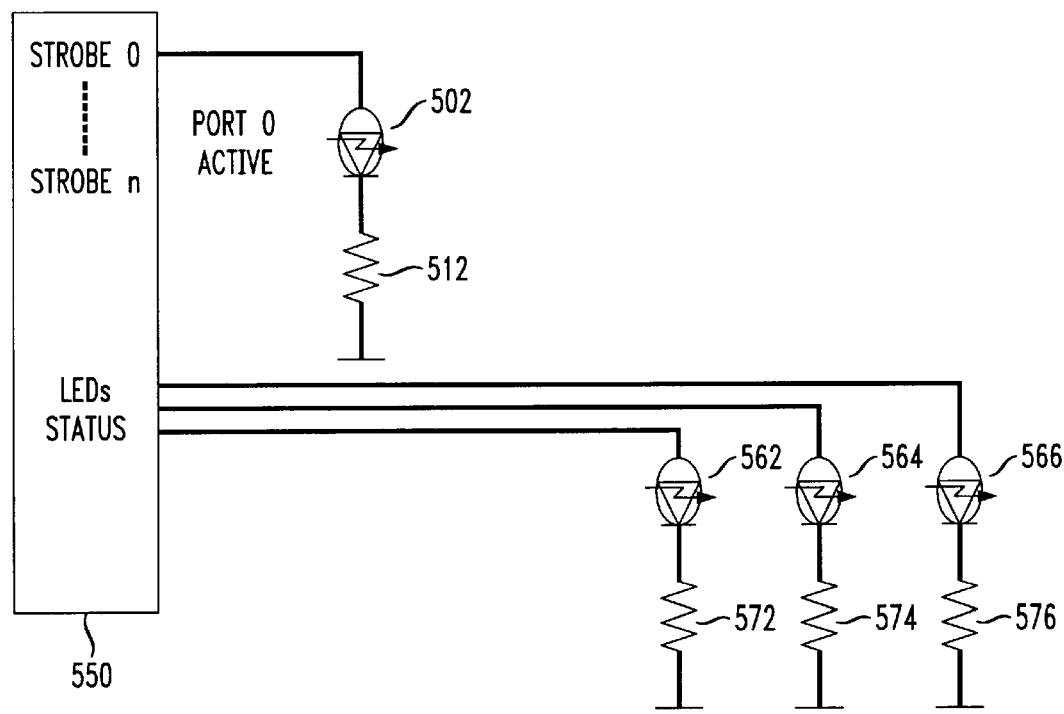
FIG. 5 shows another example use of the port valid strobe signals together with the output multiplexed status signal information, in accordance with the principles of the present invention.
Figure 6:
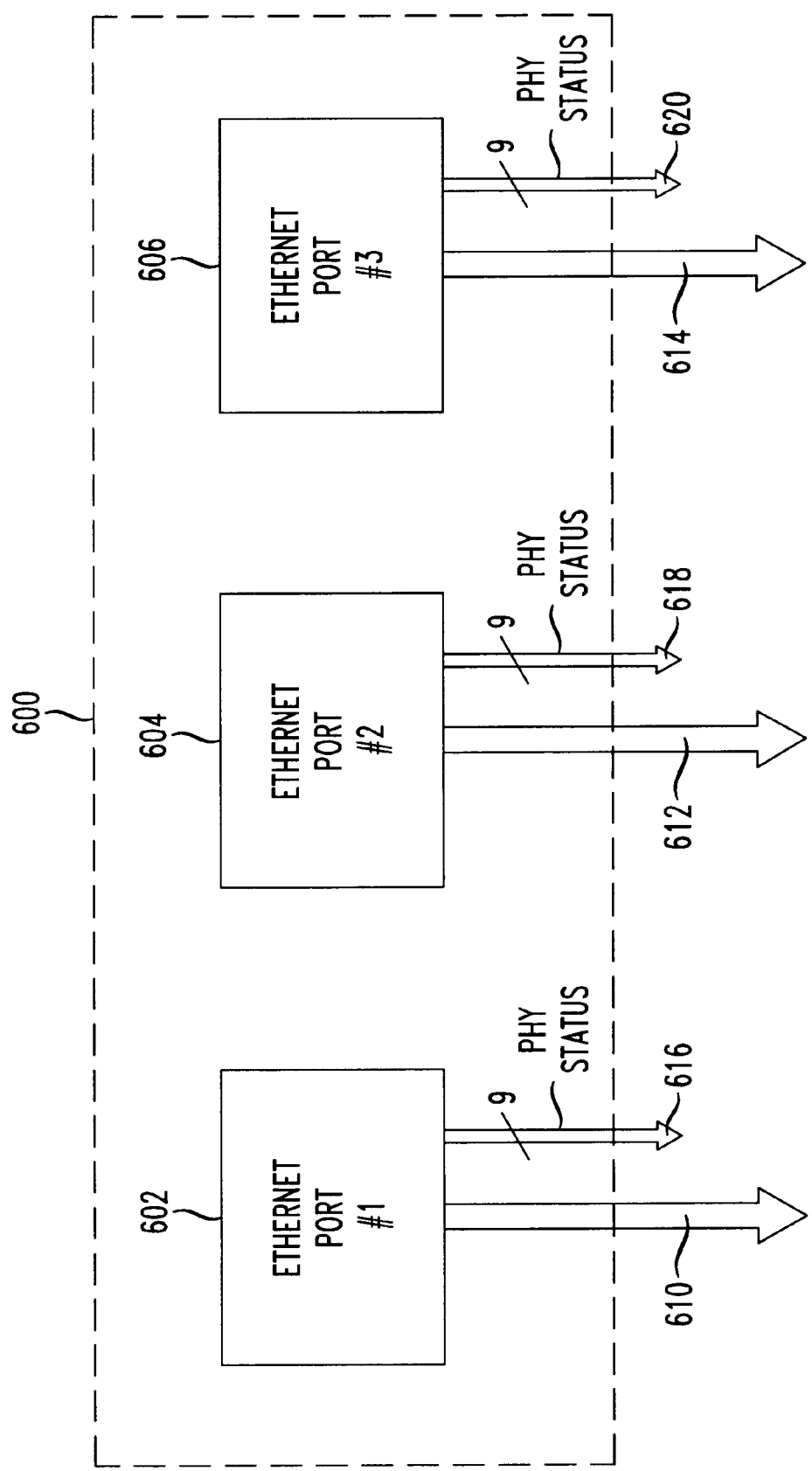
FIG. 6 shows a conventional Ethernet device (e.g., Ethernet integrated circuit) including a plurality of Ethernet ports. Each of the Ethernet ports, includes a data/address and LAN connection bus, and a status line bus (PHY status), respectively. Typically, each status line bus includes up to nine (9) separate status signals.

FIG. 5 shows another example use of the port valid strobe signals together with the output multiplexed status signal information, in accordance with the principles of the present invention.

In particular, as shown in FIG. 5, the port valid strobe signals can be used to each drive an LED, one for each Ethernet port, while the status signals are each used to drive another set of LEDs. With this architecture, the status LEDs for a particular port are recognized when the strobe LED for that particular Ethernet port is lit.

The present invention provides maximum benefit in an Ethernet system including a plurality of PHYs on the same integrated circuit.

A significant advantage of the present invention is that it achieves the ability to view any or all internal flags of an Ethernet integrated circuit with a minimum number of external signal pins. Benefits of the present invention become even more apparent as the number of ports in a single Ethernet integrated circuit increases. For example, in a twelve (12) port Ethernet chip, only twenty-one (21) external pins are required to access all internal flag signals (instead of one hundred and eight (108) otherwise required using the conventional parallel mode of operation. In a more extreme case having twenty-four (24) Ethernet ports, only thirty three external pins are required to access and display all internal flags, instead of the otherwise conventional two-hundred and sixteen (216) required using parallel mode of operation.

The principles of the present invention relate to the use of a MUXed mode of external access to internal flag signals within an Ethernet device. The MUXed mode of operation may be provided exclusive or inclusive of other modes of operation for accessing the internal flags in an Ethernet device.

While the invention has been described with reference to the exemplary embodiments thereof, those skilled in the art will be able to make various modifications to the described embodiments of the invention without departing from the true spirit and scope of the invention.

What is claimed is:

1. A multi-port parallel Ethernet device, comprising:
   a plurality of external Ethernet parallel ports allowing simultaneous access thereto external to said Ethernet device,
   an internal multiplexer having input thereto a different set of status signals corresponding respectively to each of said plurality of external Ethernet parallel ports, said internal multiplexer providing external to said Ethernet device at any one time only one set of status signals corresponding to only one of said plurality of external Ethernet parallel ports; and
   a plurality of port valid signals corresponding respectively to each of said different sets of status signals, each of said plurality of port valid signals indicating a presence of a different set of said status signals corresponding respectively to each of said plurality of external Ethernet parallel ports.

2. The multi-port parallel Ethernet device according to claim 1, further comprising:
   a port selector to control said internal multiplexer.

3. The multi-port parallel Ethernet device according to claim 1, wherein each of said set of status signals comprise:
   an ACT signal, a LINK signal, a SPEED signal, a FDUP signal, a CS signal, a TPJS signal, a TPAPS signal, an RS signal, and an XS signal.

4. The multi-port parallel Ethernet device according to claim 1, further comprising:
   an output multiplexer to allow selection between an external output from said Ethernet device of said output from said internal multiplexer; and an external output of said plurality of status signal parallel busses from said Ethernet device.

5. The multi-port parallel Ethernet device according to claim 1, wherein:
   said plurality of Ethernet parallel ports is at least eight Ethernet parallel ports.

6. A method of minimizing external pins in a multi-port parallel Ethernet device, said method comprising:
   simultaneously providing external parallel access to each of a plurality of Ethernet data ports;
   multiplexing a plurality of sets of status signals into a common status signal parallel bus, each set corresponding to a different one of said plurality of Ethernet data ports in said Ethernet device; and
   outputting said common status signal parallel bus over a common set of external pins of said Ethernet device; and
   outputting externally a plurality of port valid signals, each of said plurality of port valid signals corresponding to a different set of said plurality of sets of status signals.

7. The method of minimrizing external pins in a multi-port parallel Ethernet device according to claim 6, wherein said common status signal parallel bus comprises:
   a multiplexing of at least nine sets of status signals corresponding to a respective nine Ethernet parallel ports.

8. The method of minimizing external pins in a multi-port parallel Ethernet device according to claim 6, wherein:
   said plurality of Ethernet parallel ports is at least eight Ethernet parallel ports.

9. A method of minimizing external pins in a multi-port parallel Ethernet device, said method comprising:
   simultaneously providing external access to a plurality of Ethernet data ports;
   sequentially outputting a plurality of sets of status signals, each set corresponding to one of each of said plurality of Ethernet data ports, over a common external set of parallel pins of said Ethernet device; and
   outputting a port valid signal for each of said plurality of sets of status signals, each port valid signal indicating a presence of a corresponding set of status signals accessible external to said Ethernet device.

10. The method of minimizing external pins in a multi-port parallel Ethernet device according to claim 9, wherein each set of said plurality of sets of status signals comprises:
   at least nine parallel bit signals relating to a respective one of said plurality of Ethernet parallel ports.

11. The method of minimizing external pins in a multi-port parallel Ethernet device according to claim 9, wherein:
   said plurality of Ethernet parallel ports is at least eight Ethernet parallel ports.

12. Apparatus for minimizing external pins in a multi-port parallel Ethernet device, comprising:
   means for simultaneously providing external parallel access to each of a plurality of Ethernet data ports;
   means for multiplexing a plurality of sets of status signals into a common status signal parallel bus, each set corresponding to a different one of said plurality of Ethernet data ports in said Ethernet device;
   means for outputting said common status signal parallel bus over a common set of parallel external pins of said Ethernet device; and
   means for outputting externally a plurality of port valid signals, each of said plurality of port valid signals corresponding to a different set of said plurality of sets of status signals.

13. The apparatus for minimizing external pins in a multi-port parallel Ethernet device according to claim 12, wherein said common status signal parallel bus comprises:
   means for multiplexing at least nine sets of status signals corresponding to a respective nine Ethernet parallel ports.

14. The apparatus for minimizing external pins in a multi-port parallel Ethernet device according to claim 12, wherein:
   said plurality of Ethernet parallel ports is at least eight Ethernet parallel ports.

15. Apparatus for minimizing external pins in a multi-port parallel Ethernet device, comprising:
- means for simultaneously providing external access to a piurality of Ethernet data ports;
- means for sequentially outputting a plurality of sets of status signals, each set corresponding to one of said a plurality of Ethernet data ports, over a common external set of parallel pins of said Ethernet device; and
- means for outputting a port valid signal for each of said plurality of sets of status signals, each port valid signal indicating a presence of a corresponding set of status signals accessible external to said Ethernet device.

16. The apparatus for minimizing external pins in a multi-port parallel Ethernet device according to claim 15, wherein each set of said plurality of sets of status signals:
- at least nine parallel bit signals relating to a respective one of said plurality of Ethernet parallel ports.

17. The apparatus for minimizing external pins in a multi-port parallel Ethernet device according to claim 15, wherein:
- said plurality of Ethernet parallel ports is at least eight Ethernet parallel ports.

* * * * *